(12) United States Patent
Nakahata et al.

(10) Patent No.: US 8,040,476 B2
(45) Date of Patent: Oct. 18, 2011

(54) DISPLAY DEVICE AND METHOD OF PRODUCING THE SAME

(75) Inventors: Takumi Nakahata, Tokyo (JP);
Takanori Okumura, Tokyo (JP);
Yusuke Yamagata, Tokyo (JP); Naoki Nakagawa, Tokyo (JP); Masafumi Agari, Tokyo (JP); Tetsuya Satake, Tokyo (JP); Toru Kokogawa, Tokyo (JP); Kenji Arita, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 336 days.

(21) Appl. No.: 12/471,970

(22) Filed: May 26, 2009

(65) Prior Publication Data
US 2009/0290113 A1 Nov. 26, 2009

(30) Foreign Application Priority Data

May 26, 2008 (JP) ................................ 2008-136279
Apr. 17, 2009 (JP) ................................ 2009-100836

(51) Int. Cl.
*G02F 1/1333* (2006.01)
(52) U.S. Cl. ............ 349/122; 349/56; 349/84; 349/123; 349/124; 349/125

(58) Field of Classification Search ............... 349/56, 349/84, 122, 123, 124, 125
See application file for complete search history.

(56) References Cited

U.S. PATENT DOCUMENTS

| 6,926,574 B2 * | 8/2005 | Fujiwara ............... 445/24 |
| 6,979,243 B2 * | 12/2005 | Watanabe ............... 445/24 |
| 7,012,666 B2 * | 3/2006 | Morishita et al. ........... 349/149 |

FOREIGN PATENT DOCUMENTS

| JP | 2004-46115 | 2/2004 |
| JP | 2005-84228 | 3/2005 |
| JP | 2007-94102 | 4/2007 |

OTHER PUBLICATIONS

U.S. Appl. No. 12/330,105, filed Dec. 8, 2008, Tetsuya Satake, et al.

* cited by examiner

*Primary Examiner* — Jennifer Doan
(74) *Attorney, Agent, or Firm* — Oblon, Spivak, McClelland, Maier & Neustadt, L.L.P.

(57) ABSTRACT

The display device includes a pair of insulating substrates arranged so as to be opposed, a bonding layer, and a strain suppressing plate. The bonding layer is provided on the outer surface side of one insulating substrate. The strain suppressing plate has rigidity higher than that of the insulating substrate to suppress the strain caused by curving the insulating substrate. The strain suppressing plate is fixed to the insulating substrate by the bonding layer.

12 Claims, 17 Drawing Sheets

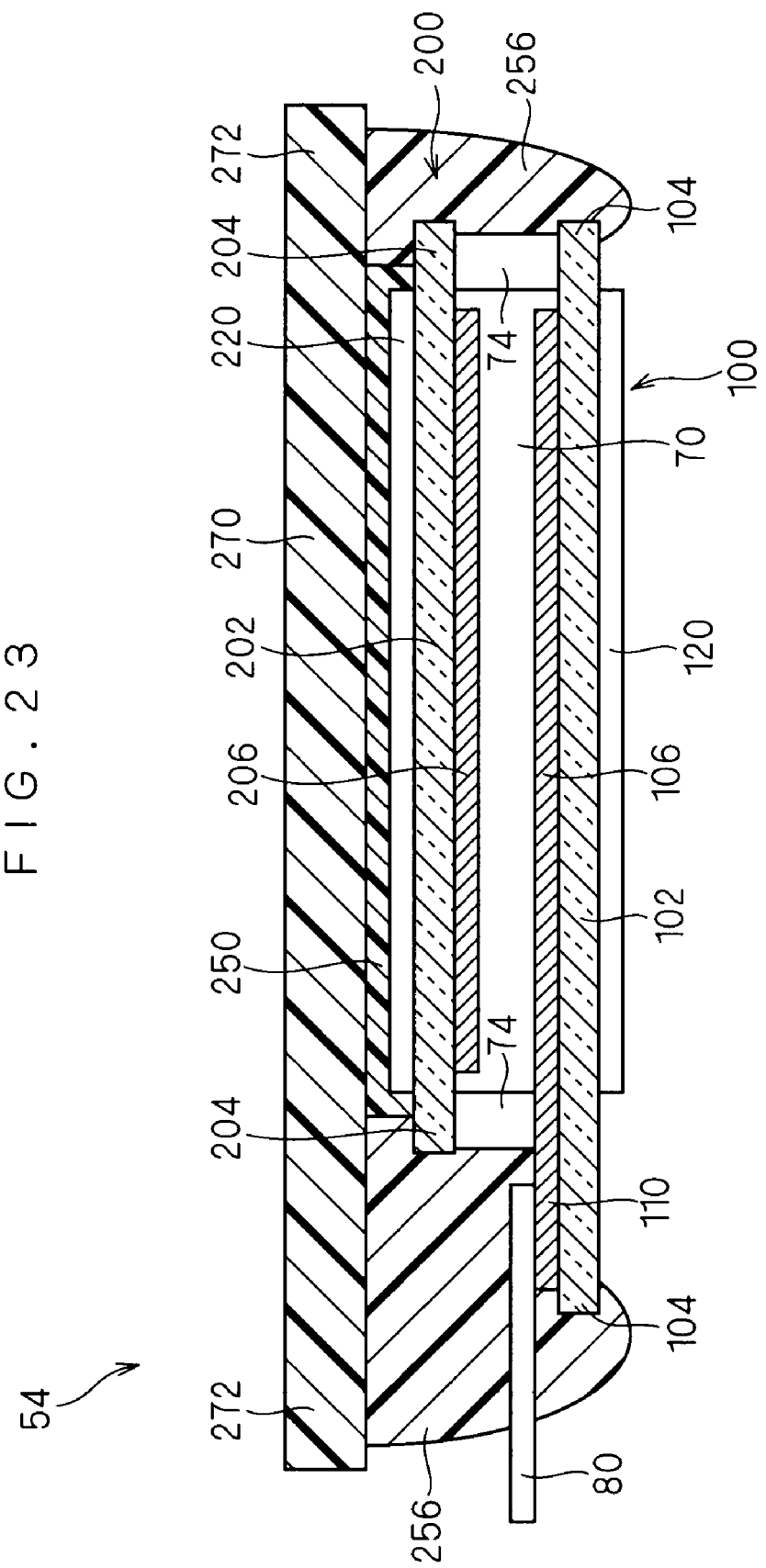

DISPLAY DEVICE AND METHOD OF PRODUCING THE SAME

BACKGROUND OF THE INVENTION

1. Field of the Invention

The present invention relates to a display device and a method of producing the same and, more particularly, to a display device and a method of producing the same in which reliability, durability, yield and the like are improved by preventing a strain and a crack from being generated in a substrate.

2. Description of the Background Art

Flat display devices represented by a liquid crystal display device (LCD) are used in various kinds of field because of characteristics such as light in weight, thin, and low power consumption. Among them, the liquid crystal display device is widely used in information devices represented by a personal computer. In addition, recently, the liquid crystal display device is widely used as a TV component and a conventional Braun tube is being replaced with it.

Moreover, a display device having a self-luminous light element in a display area, an electroluminescent (EL) display device, for example has been also used as a next-generation thin type display device. The EL display device has the characteristics such as wide viewing angle, high contrast, and high-speed response along with a moving image.

For example, many liquid crystal display devices are produced on a so-called mother glass substrate at once by multi-panel producing technology, in some cases. More specifically, a plurality of structures (cell structures) of the liquid crystal display devices are formed on the mother glass substrate larger than a glass substrate as a completed product, and the mother glass substrates are attached and bonded together. The bonded mother glass substrates are cut to provide an individual liquid crystal display device.

Recently, the substrate is required to be thin to reduce its weight in the display device. In addition, since a screen can be curved when the thin substrate is used, the substrate is required to be thin in view of the above point.

One of measures to satisfy the request of thinning is such that a thin glass substrate is used from the beginning of the production. However, a glass substrate having a thickness less than 0.5 mm is difficult to handle at the time of production because it is bent under its own weight or a crack is easily generated. Thus, a production yield deteriorates.

In addition, using a resin film and the like instead of the glass substrate is one idea. However, since the upper temperature limit of the resin film substrate is 200° C., there are constraints in view of a film forming temperature, etc.

In addition, a production method is disclosed in which a relatively thick glass substrate is used when the production process begins, and the glass substrate is etched away to be thinned during the production process (refer to Japanese Patent Application Laid-Open Nos. 2004-46115 and 2005-84228, for example). According to this production method, the above-described difficulty in handling can be reduced. In addition, the substrate can be thinner than 0.15 mm by etching, and can be curved so as to have a curvature radius of 200 mm. When an electric signal is applied while the substrate is curved, an image can be displayed on a curved screen.

The liquid crystal display of above Japanese Patent Application Laid-Open No. 2005-84228 includes a flexible substrate having at least one reinforcing part.

Japanese Patent Application Laid-Open No. 2007-94102 discloses a liquid crystal display device having flexible substrates which can be curved.

According to the liquid crystal display device produced by using the thin glass substrate from the beginning of the production, or thinning the glass substrate during the production, the problem is that the thin glass substrate is distorted. More specifically, according to the liquid crystal display device having the structure in which the thin glass substrates are bonded at their peripheries, when the screen is curved according to a design, or when the screen is curved for some reasons, the glass substrate is strained. Since the gap between the substrates, that is, the thickness of the liquid crystal layer at the distorted part differs from that of the other part, or since the opposed substrates are displaced, the image quality deteriorates.

In addition, according to the production method for producing many devices at once, the problem is that a fine crack (microscopic crack) is generated at the cut part, that is, the cut end part of the substrate. The microscopic crack could be a large crack when the substrate is curbed, for example. In addition, it is reported that the crack becomes large rapidly when water enters into the microscopic crack. Since the microscopic crack cannot be discovered by visual inspection or even by microscopic inspection in some cases, it could be a large crack while the liquid crystal display device is used. In addition, not only the microscopic crack generated when the substrate is cut, but also a crack generated at the end part of the substrate caused by various reasons during the production process could be a larger crack.

Here, the above problems could arise in a display device other than the liquid crystal display device, and in a substrate formed of a material other than a glass material.

SUMMARY OF THE INVENTION

It is an object of the present invention to provide a display device and a method of producing the same in which image quality, reliability, durability, and yield are improved by preventing both strain and crack enlargement from being generated in a substrate.

A display device according to the present invention includes a pair of insulating substrates, a bonding layer, and a strain suppressing plate. The pair of insulating substrates are arranged so as to be opposed. The bonding layer is provided on the outer surface side of one insulating substrate of the pair of insulating substrates. The strain suppressing plate is fixed to the one insulating substrate by the bonding layer. The strain suppressing plate has rigidity higher than that of the one insulating substrate to suppress a strain caused by curving the one insulating substrate.

A production method of the display device according to the present invention includes steps (a) and (b). In the step (a), an insulating substrate and a strain suppressing plate are opposed to each other so that the strain suppressing plate has a projection part extending beyond the insulating substrate, and they are fixed to each other by a bonding agent. The strain suppressing plate has rigidity higher than that of the insulating substrate to suppress a strain caused by curving the insulating substrate. In the step (b), a resin material is applied onto the projection part of the strain suppressing plate so that an end part of the insulating substrate is covered with the resin material.

Both strain and crack enlargement are prevented and as a result, image quality, reliability, durability, yield and the like can be improved.

These and other objects, features, aspects and advantages of the present invention will become more apparent from the following detailed description of the present invention when taken in conjunction with the accompanying drawings.

BRIEF DESCRIPTION OF THE DRAWINGS

FIG. 23 is a sectional view illustrating the display device according to the second embodiment and production method thereof.

DESCRIPTION OF THE PREFERRED EMBODIMENTS

First Embodiment

Figure 1:
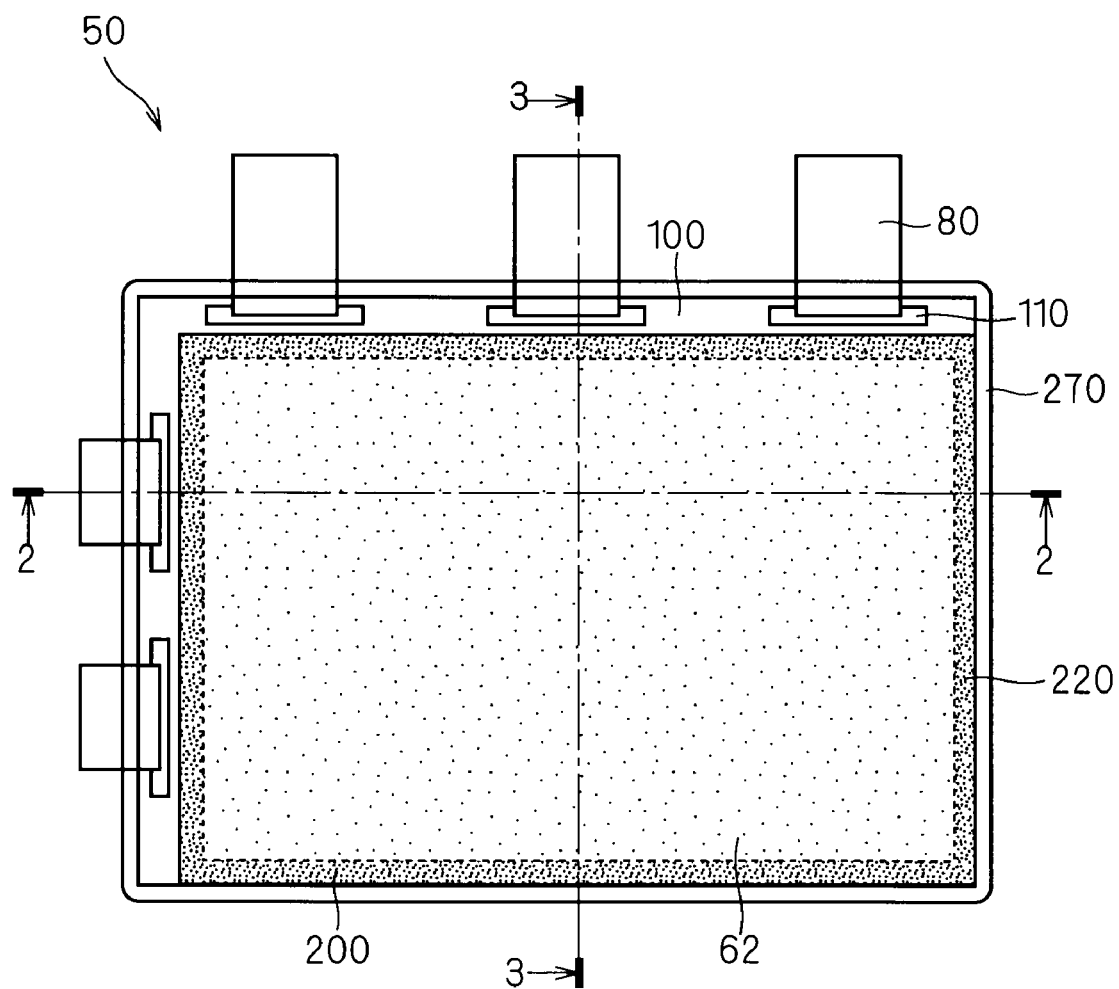
FIG. 1 is a plan view illustrating a display device according to a first embodiment.
Figure 2:
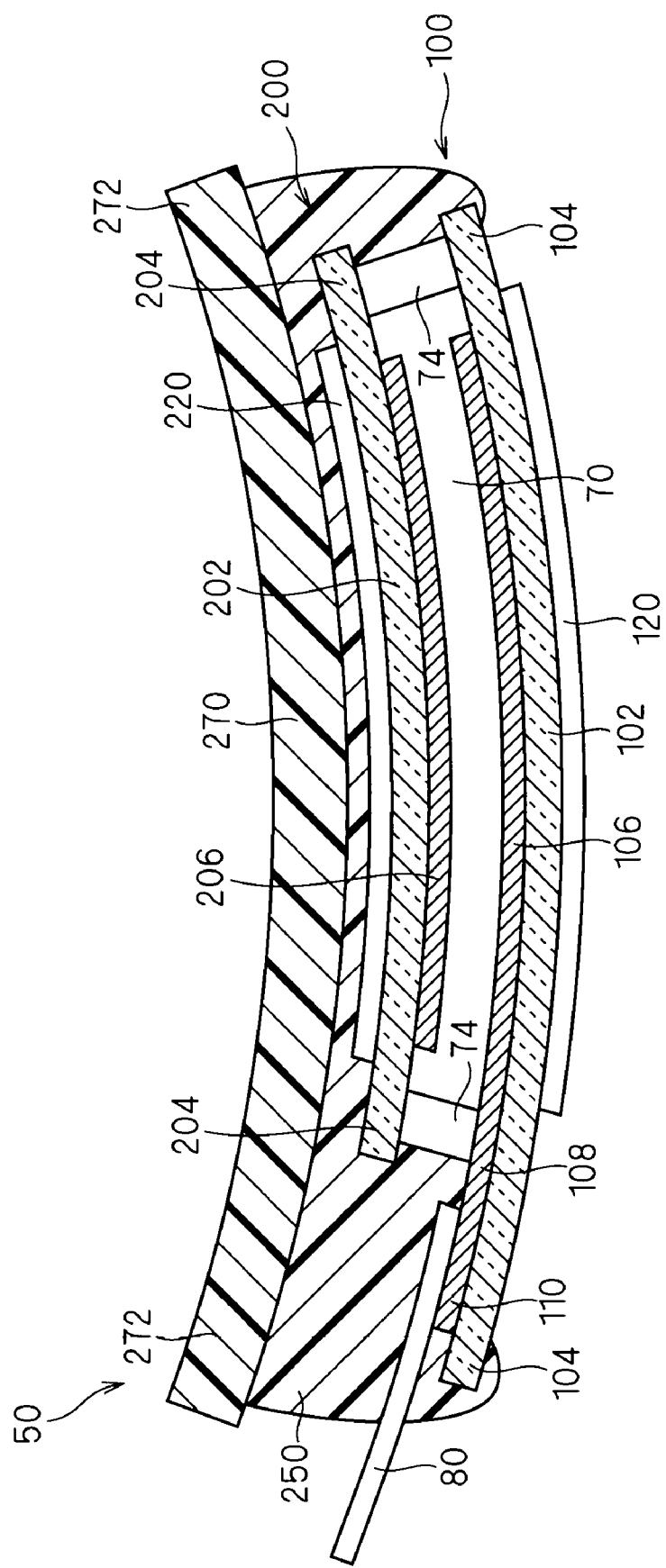
FIG. 2 is a sectional view taken along line 2-2 in FIG. 1.
Figure 3:
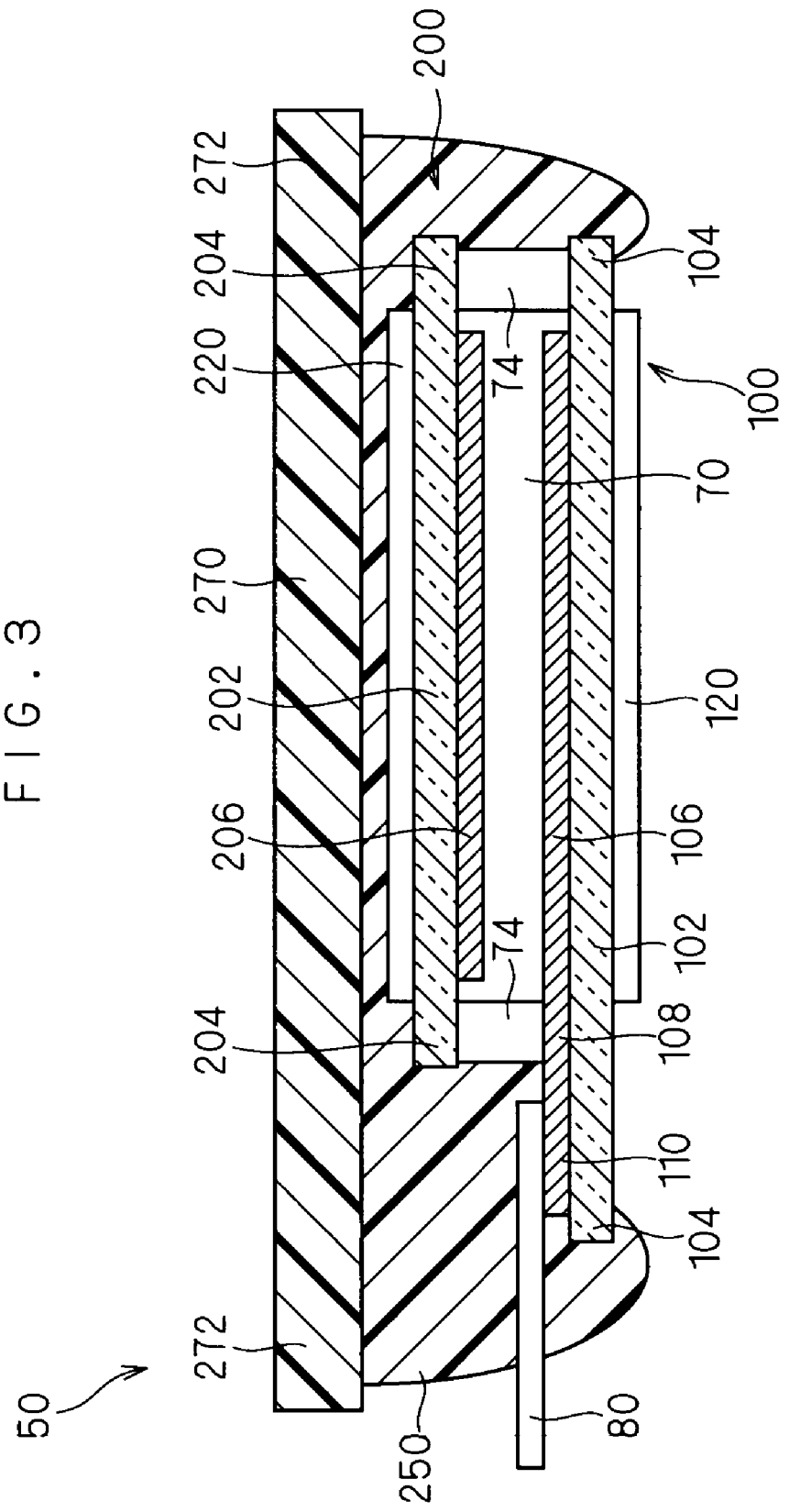
FIG. 3 is a sectional view taken along line 3-3 in FIG. 1.

FIGS. 1 to 3 illustrates a liquid crystal display device 50 as one example of a display device according to a first embodiment of the present invention. FIG. 1 is a plan view, FIG. 2 is a sectional view taken along line 2-2 in FIG. 1, and FIG. 3 is a sectional view taken along line 3-3 in FIG. 1.

In addition, although one example of a TN (Twisted Nematic) type is used as the liquid crystal display device 50 here, the liquid crystal display device 50 may have another structure of the TN type or may have a structure (FFS (Fringe Field Switching) type or IPS (In-Plane Switching) type and the like) different from the TN type. In addition, although the case where the liquid crystal display device 50 is a color display type is illustrated, it can be a single color display type.

The liquid crystal display device 50 illustrated in FIGS. 1 to 3 includes a pair of insulating substrates 102 and 202, a liquid crystal (or liquid crystal layer) 70, and a seal 74.

Each of the insulating substrates 102 and 202 includes a glass plate having a thickness of about 0.1 to 0.2 mm. In addition, when the liquid crystal display device 50 is a transmission type or a semi-transmission type, both of the insulating substrates 101 and 202 are formed of a transparent material, but when the liquid crystal display device 50 is a reflection type, a substrate that does not contain a display surface of the insulating substrates 101 and 202 may not be transparent.

The insulating substrates 102 and 202 are arranged such that main surfaces thereof are opposed to each other, and a gap having a thickness of 3 to 10 μm, for example, is provided between the substrates 102 and 202. Since the insulating substrate 102 is larger than the insulating substrate 202, the insulating substrate 102 has a projection part extending beyond the insulating substrate 202 when they are arranged so as to be opposed.

The liquid crystal 70 is arranged between the insulating substrates 102 and 202. The seal 74 is arranged between the insulating substrates 102 and 202 to bond and fix both substrates 102 and 202. The seal 74 is arranged along the periphery parts of the insulating substrates 102 and 202 so as to surround the liquid crystal layer 70. Thus, the liquid crystal 70 is housed in a vessel made up of the insulating substrates 102 and 202 and the seal 74.

A pixel area (or display area) 62 in which an image is displayed is provided in a region in which the liquid crystal layer 70 is arranged in a plan view of the insulating substrates 102 and 202. Many pixels are formed in a matrix shape in the pixel area 62. For example, when a screen size is 14 inches (its diagonal line length is about 36 cm) and its display standard is VGA (Video Graphic Array), about 920,000 pixels (or 640×480×3 pixels) are arranged in a matrix pattern in the pixel area 62.

The liquid crystal display device 50 further includes an active element part 106, a lead-out wiring 108, an external wiring connection terminal 110, and an external wiring 80. These components 106, 108, 110, and 80 are arranged on the inner surface side of the insulating substrate 102, that is, on the side of the opposed insulating substrate 202.

The active element part 106 contains various components to drive each pixel, such as an active element (TFT and the like), a pixel electrode, a capacity element, and a wiring. The active element part 106 is arranged in the pixel area 62. The lead-out wiring 108 connects the active element part 106 to the external wiring connection terminal 110, and extending across the seal 74. The external wiring connection terminal 110 is arranged on the projecting part of the insulating substrate 102 extending beyond the insulating substrate 202 (a part in which the insulating substrate 202 does not overlap). The external wiring 80 is connected to the external wiring connection terminal 110. The external wiring 80 includes a flexible cable, for example. According to the above constitution, an electric signal and the like is transmitted from the external part of the insulating substrate 102 to the active element part 106 through the external wiring 80, the external wiring connection terminal 110, and the lead-out wiring 108.

The liquid crystal display device 50 further includes a color filter/electrode part 206 having a laminated structure of a color filter and an electrode (common electrode). The color filter/electrode part 206 is arranged on the inner surface side of the insulating substrate 202, that is, on the side of the opposed insulating substrate 102. In addition, the color filter/electrode part 206 is arranged in the pixel area 62 and opposed to the active element part 106 across the liquid crystal layer 70.

The liquid crystal display device 50 further includes polarizing plates 120 and 220. The polarizing plate 120 is arranged on the outer surface side of the insulating substrate 102, that is, arranged on the opposite side of the paired insulating substrate 202. Meanwhile, the polarizing plate 220 is arranged on the outer surface side of the insulating substrate 202, that is, arranged on the opposite side of the paired insulating substrate 102. Thus, the polarizing plates 120 and 220 are opposed to each other across the insulating substrate 102, the active element part 106, the liquid crystal layer 70, the color filter/electrode part 206, and the insulating substrate 202. In addition, the polarizing plates 120 and 220 are arranged so as to hold the pixel area 62.

Here, a structure including the insulating substrate 102, the active element part 106, the lead-out wiring 108, the external wiring connection terminal 110, and the polarizing plate 120 is referred to as an array substrate 100. In addition, a structure including the insulating substrate 202, the color filter/electrode part 206, and the polarizing plate 220 is referred to as a color filter substrate 200. In addition, the array substrate may be referred to as an element substrate, and the color filter substrate may be referred to as an opposite substrate in some cases.

The liquid crystal display device 50 further includes a bonding layer 250 and a strain suppressing plate 270 on the outer surface side of the insulating substrate 202. According to the illustrated example, the bonding layer 250 is provided on the polarizing plate 220, and the strain suppressing plate 270 is arranged on the bonding layer 250. The strain suppressing plate 270 is fixed to the whole surface of the insulating substrate 202 by the bonding layer 250.

The strain suppressing plate 270 is a member to suppress a strain 310 (see FIG. 16) that will be described below. The strain suppressing plate 270 is formed of a flexible material that can be largely deformed as compared with the material (glass, for example) of the insulating substrate 202. In addition, when the displayed image is seen through the strain suppressing plate 270, the strain suppressing plate 270 is required to be transparent. Thus, the strain suppressing plate 270 can be formed of an acrylic or polycarbonate resin, for example.

In addition, the strain suppressing plate 270 has rigidity higher than that of the insulating substrate 202. This rigidity can be given by adjusting its thickness. For example, when the thickness of the glass substrate of the insulating substrate 202 is about 0.1 to 0.2 mm, the strain suppressing plate 270 having rigidity higher than that of the substrate 202 can be made up of an acrylic substrate or a polycarbonate substrate having a thickness of about 0.3 to 1.0 mm.

The strain suppressing plate 270 is larger than the insulating substrate 202 and has a part 272 extending beyond the insulating substrate 202 while it is attached on the insulating substrate 202. The drawing illustrates the case where the projection part 272 is provided over the whole periphery of the strain suppressing plate 270.

The bonding layer 250 is provided on the projection part 272 of the strain suppressing plate 270 as well as between the insulating substrate 202 and the strain suppressing plate 270. At this time, the bonding layer 250 on the projection part 272 covers an end part 204 of the insulating substrate 202.

In addition, the external wiring connection terminal 110 is opposed to the projection part 272 of the strain suppressing plate 270, and the connection part where the terminal 110 and the external wiring 80 are connected each other is covered with the bonding layer 250 formed on the projection part 272.

In addition, the bonding layer 250 formed on the projection part 272 covers an end 104 of the other insulating substrate 102.

According to the liquid crystal display device 50 in the above, the insulating substrates 102 and 202 and the strain suppressing plate 270 are curved so as to have a curvature center on the side of the insulating substrate 202 in a sectional direction shown in FIG. 2. In other words, the insulating substrates 102 and 202 and the strain suppressing plate 270 have a configuration provided by cutting a part of a side surface of a cylinder with a plane parallel to a center axis of the cylinder, for example. Thus, when the displayed image is seen from the side of the insulating substrate 202 on which the curvature center exists (that is, the center axis of the cylinder exists), a concave display screen is provided. Meanwhile, when the displayed image is seen from the side of the insulating substrate 102, the convex display screen is provided.

Next, a production method of the liquid crystal display device 50 will be described with reference FIGS. 4 to 14. Here, a production method which is referred to as a multi-device (or plurality of devices) producing technology will be described.

Figure 4:
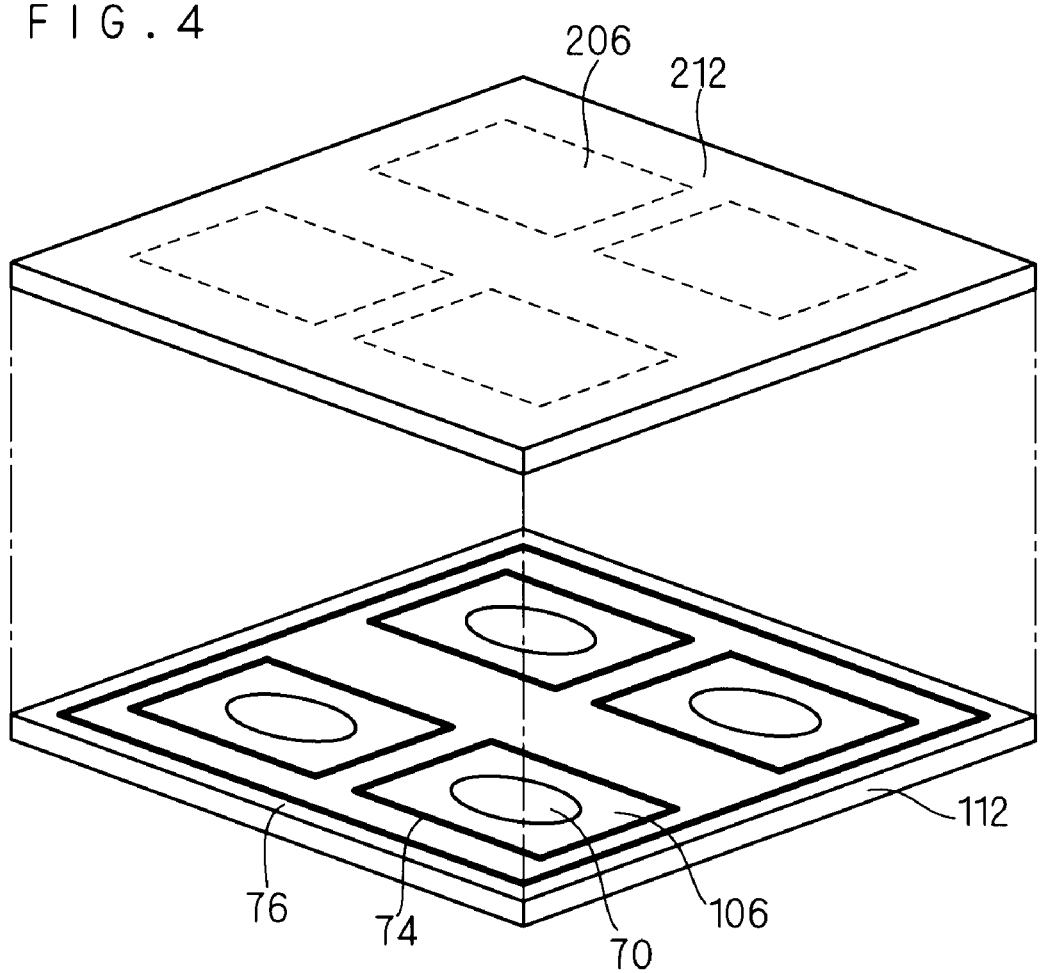
FIG. 4 is a perspective view illustrating a production step of the display device according to the first embodiment.
Figure 5:
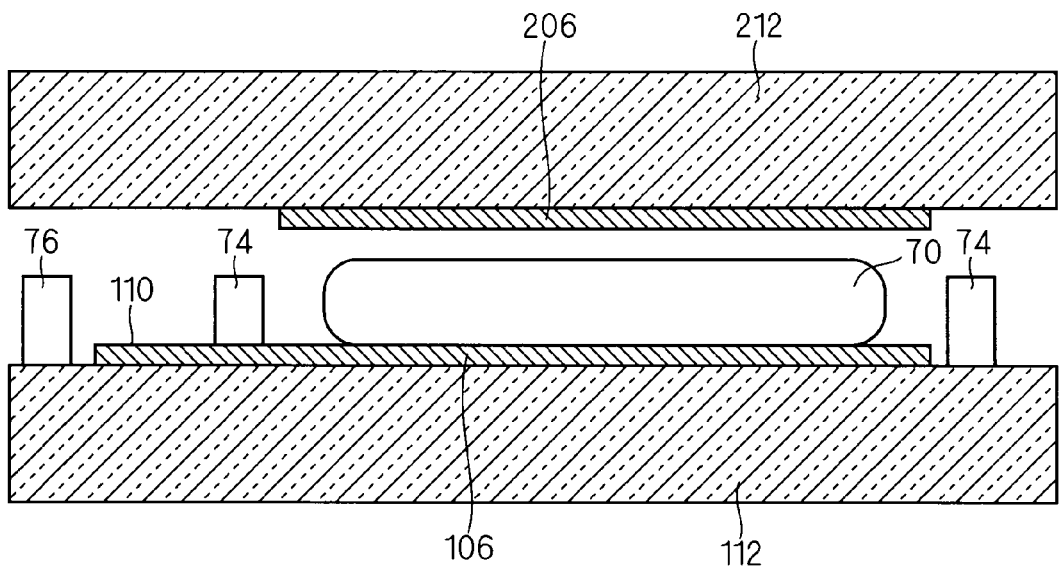
FIGS. 5 to 8 are sectional views illustrating production steps of the display device according to the first embodiment.

First, insulating substrates 112 and 212 larger than the insulating substrates 102 and 202 in the liquid crystal display device 50 and serving as mother glass substrates are prepared. Thus, as shown in FIGS. 4 and 5, the plurality of active element parts 106 and the like are formed on the insulating substrate 112 corresponding to the insulating substrates 102, and the plurality of color filter/electrode parts 206 are formed on the insulating substrate 212 corresponding to the insulating substrates 202. FIG. 4 illustrates the case where the four liquid crystal display devices 50 are produced from the large insulating substrates 112 and 212. Here, the insulating substrates 112 and 212 serving as the mother glass substrates are thicker than the insulating substrates 102 and 202, and each has a thickness of 0.5 to 1.0 mm, for example.

Then, as shown in FIG. 4, the seal 74 is applied so as to surround each active element part 106 like a frame, and a dummy seal 76 is applied so as to surround the whole periphery of the insulating substrate 112 like a frame. The seals 74 and 76 include an epoxy based bonding agent whose type is a heat curing type cured by heat or a light curing type cured by light such as UV. Here, although the case where both of the seals 74 and 76 are applied on the insulating substrate 112 is illustrated, at least one of the seal 74 and 76 may be applied on the insulating substrate 212.

Then, as shown in FIGS. 4 and 5, the liquid crystal 70 is dropped in the region surrounded by the seal 74.

Figure 6:
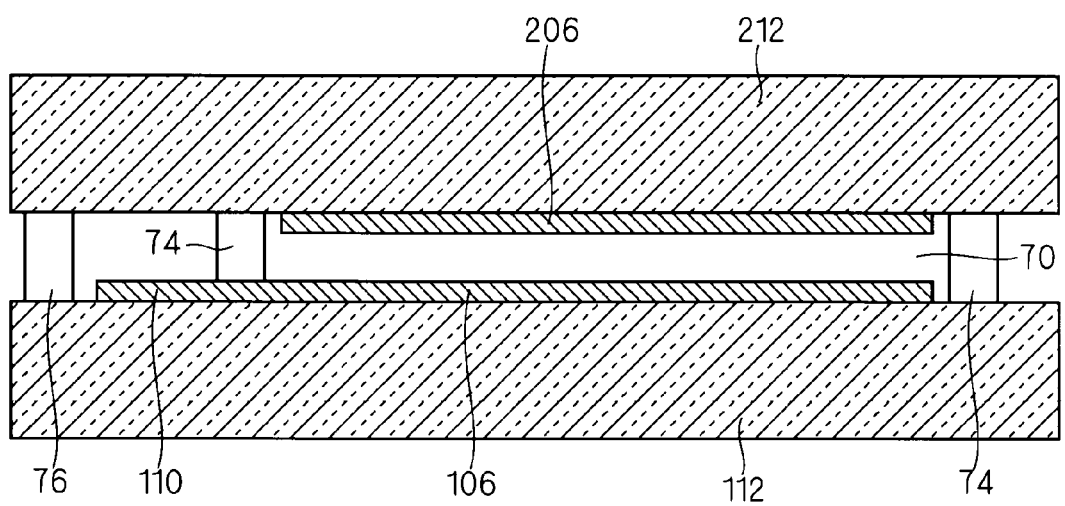

Then, as shown in FIG. 6, the insulating substrates 112 and 212 are opposed then are stuck together after the substrates are aligned. By hardening the seals 74 and 76 being stuck together, both of the substrates 112 and 212 are bonded. By bonding the insulating substrates 112 and 212, the liquid crystals 70 are confined in the space surrounded by the substrates 112 and 212 and the seals 74.

Here, although the liquid crystal layer 70 is formed by an instillation method or one-drop-fill method here, the liquid crystal layer 70 may be formed by an immersion injection method or dipping method and the like.

Figure 7:
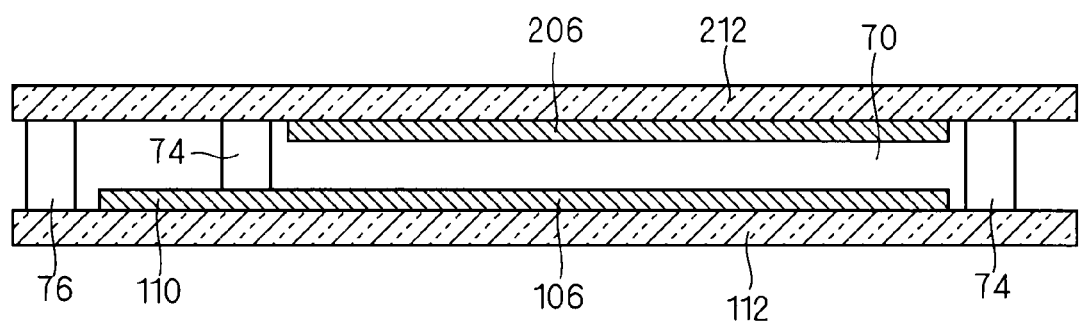

Then, as shown in FIG. 7, the insulating substrates 112 and 212 are thinned so as to have the same thickness as that of the above insulating substrates 102 and 202. This substrate thinning process can be performed by a chemical mechanical polishing method or a chemical etching method, for example. According to the above methods, the substrate can be thinned to be up to about 0.1 mm.

Figure 8:
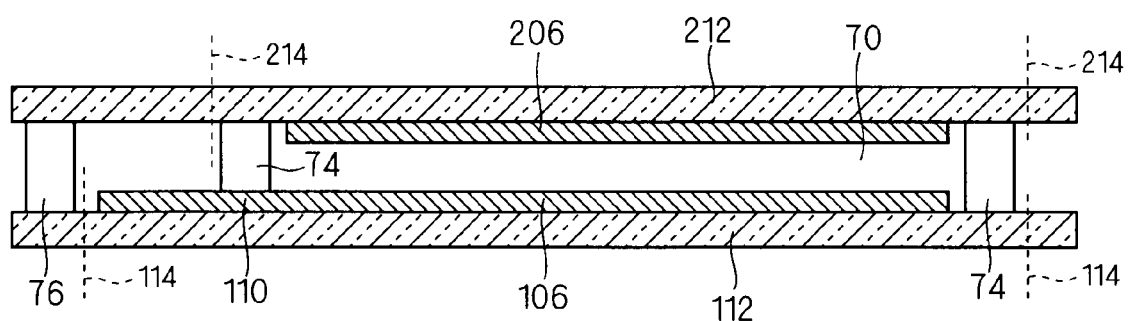
Figure 9:
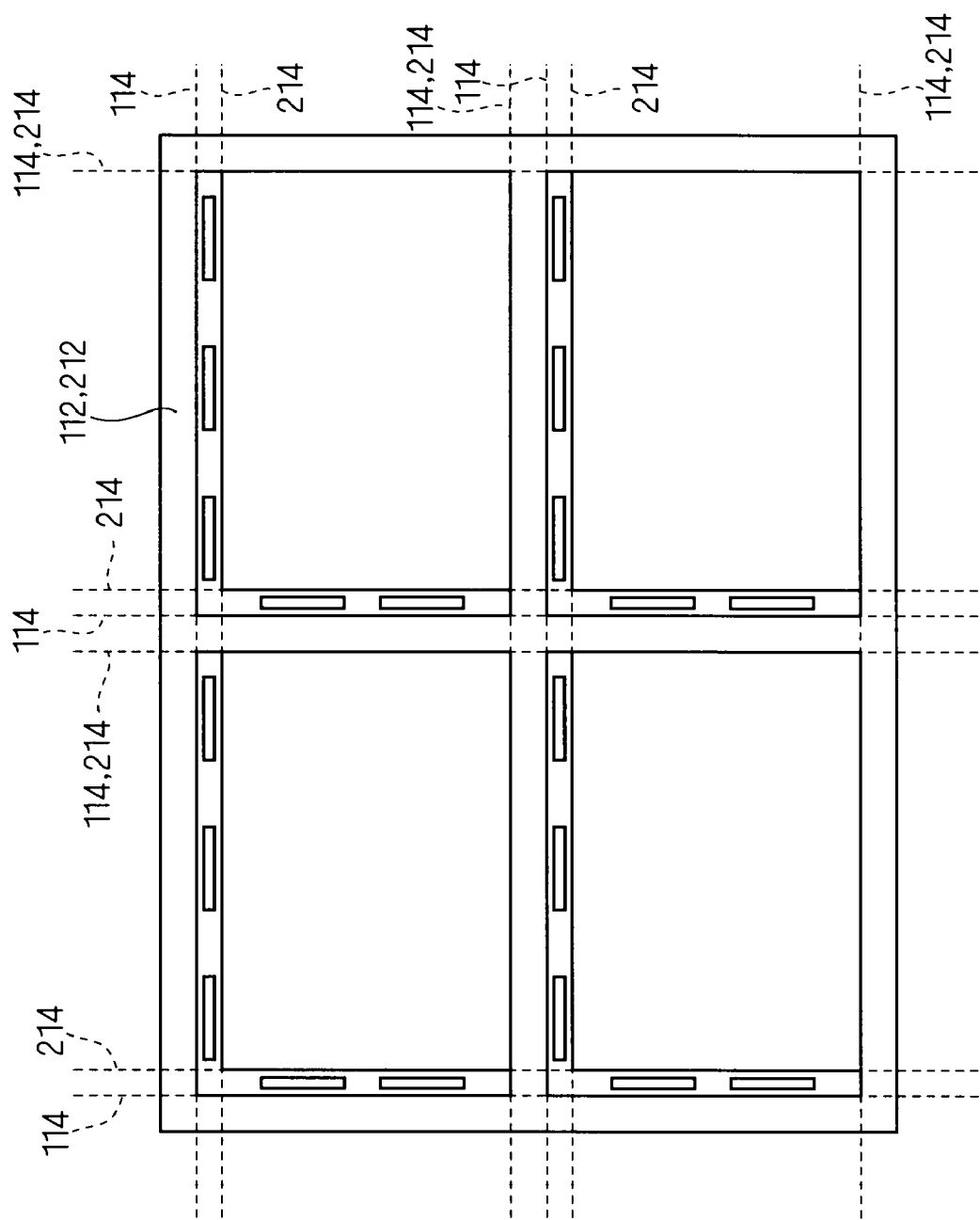
FIG. 9 is a plan view illustrating a production step of the display device according to the first embodiment.
Figure 10:
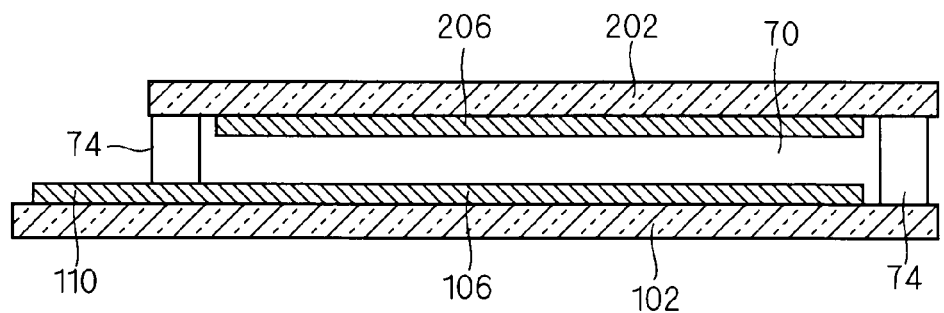
FIGS. 10 to 14 are sectional views illustrating production steps of the display device according to the first embodiment.

Then, as shown in FIGS. 8 and 9, the insulating substrate 112 is cut along a cutting line 114, and the insulating substrate 212 is cut along a cutting line 214. Thus, as shown in FIG. 10, the liquid crystal display device having the insulating substrates 102 and 202 is provided.

Figure 11:
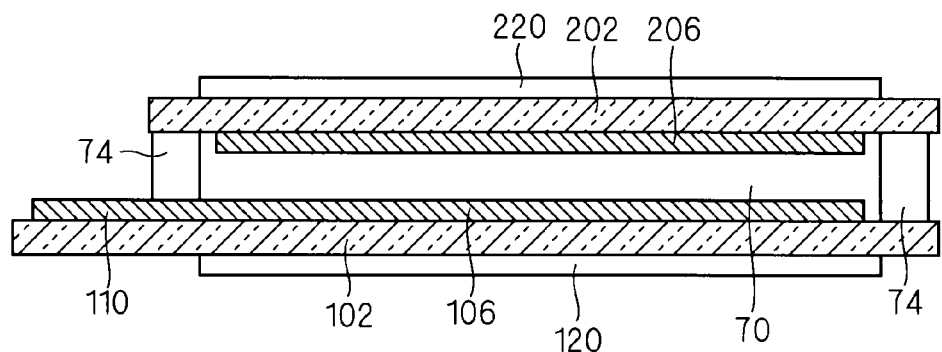
Figure 12:
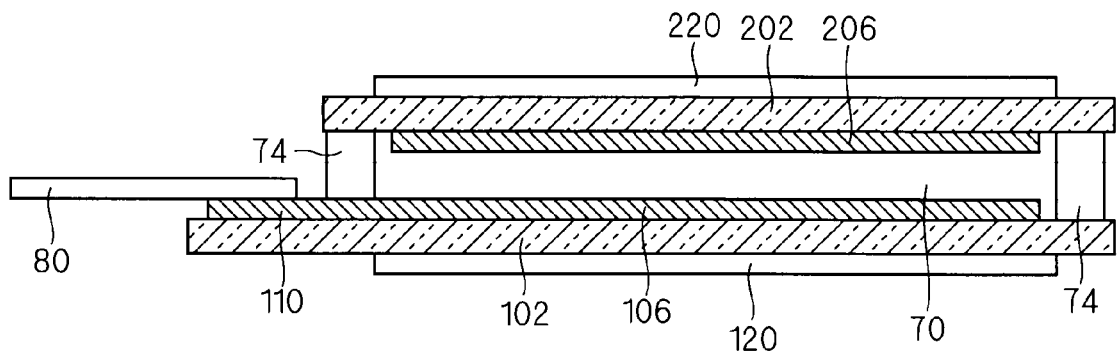

Then, as shown in FIG. 11, the polarizing plate 120 is attached on the insulating substrate 102, and the polarizing plate 220 is attached on the insulating substrate 202. Then, as shown in FIG. 12, the external wiring 80 is connected to the external wiring connection terminal 110 by pressure bonding, for example.

Figure 13:
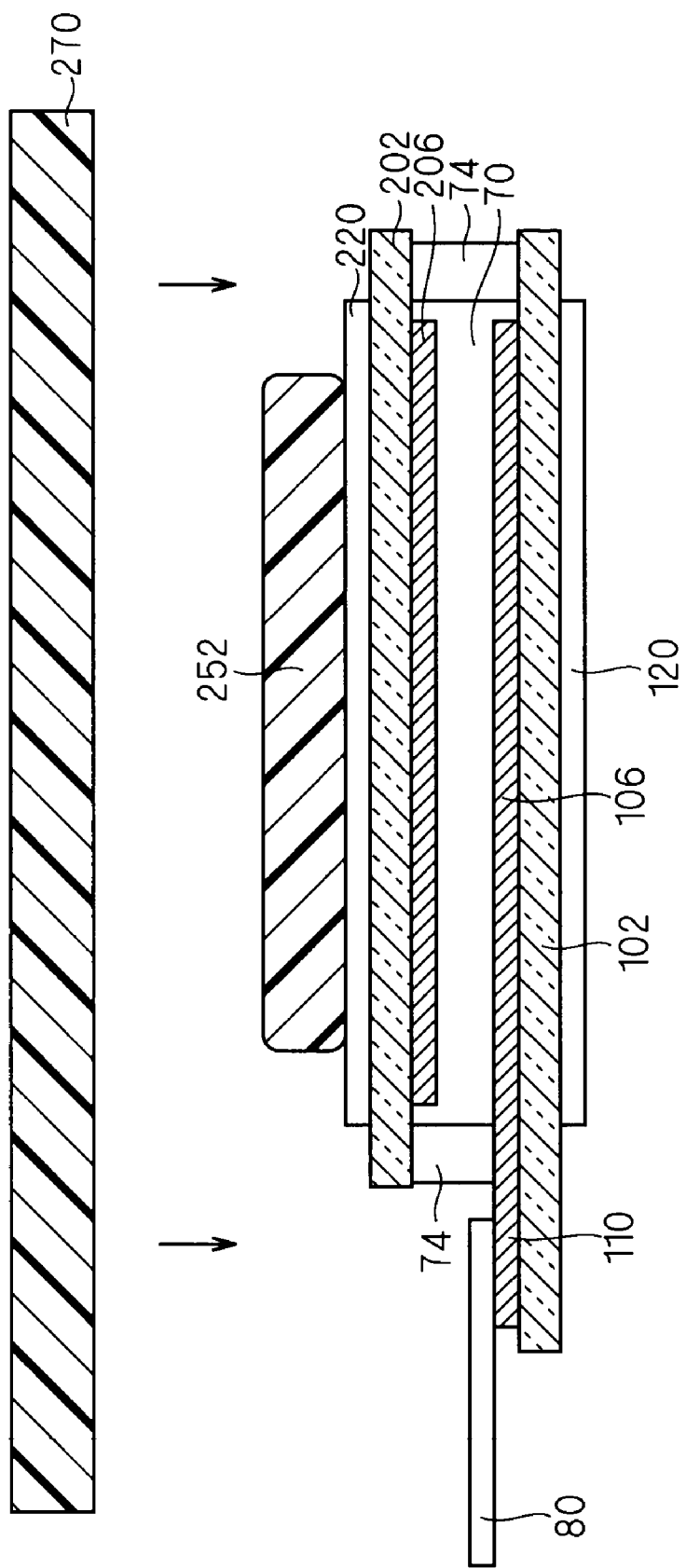
Figure 14:
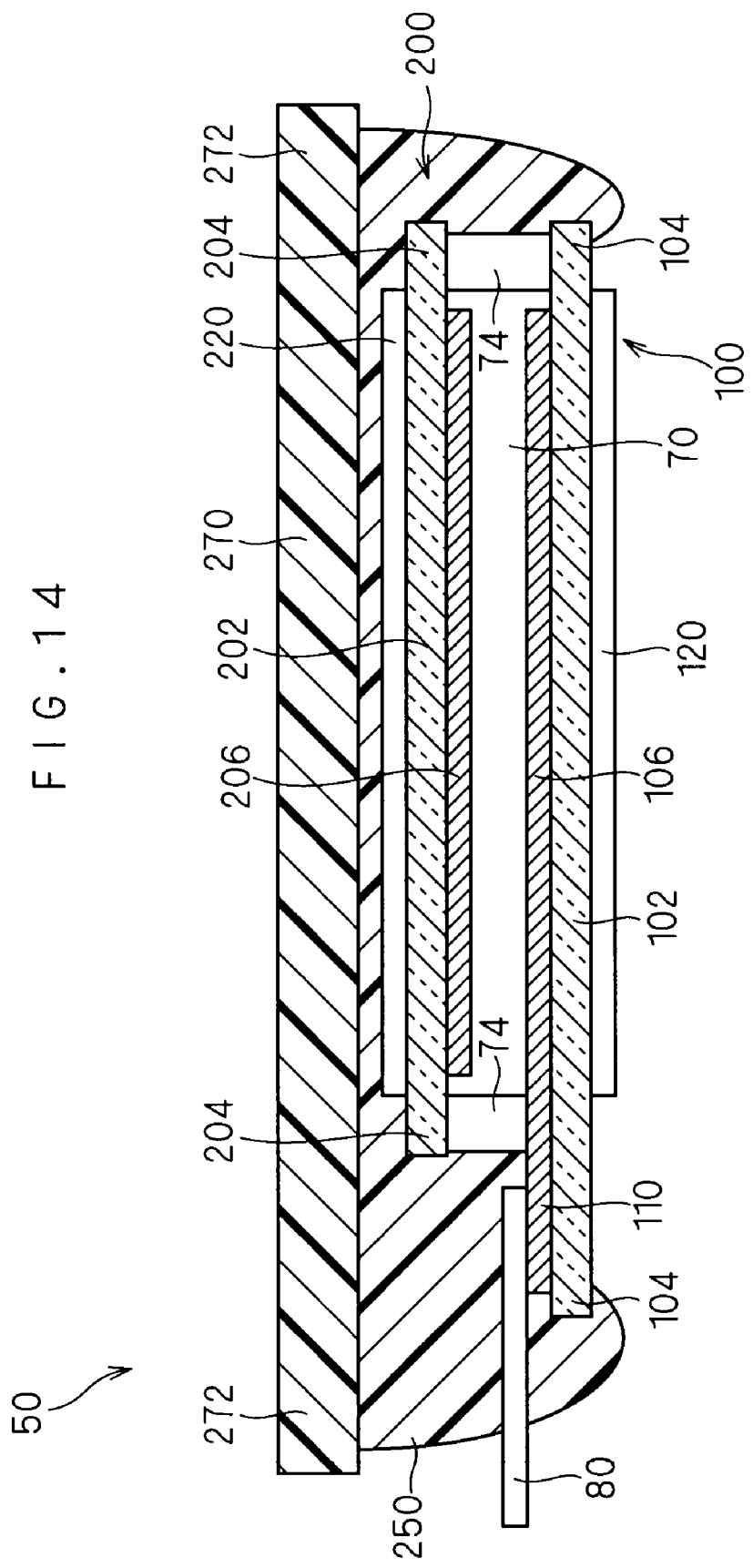

Then, as shown in FIG. 13, a liquid type or gel type bonding agent 252 is applied onto the polarizing plate 120, the insulating substrate 202 and the strain suppressing plate 270 are opposed so that the strain suppressing plate 270 has the projection part 272. Thus, the polarizing plate 270 is attached by the bonding agent 252 and the insulating substrate 202 and the strain suppressing plate 270 are fixed to each other. FIG. 14 shows the state after they have been attached.

When the strain suppressing plate 270 is attached, the bonding agent 252 overflows from between the insulating substrate 202 and the strain suppressing plate 270 and reaches the projection part 272 of the strain suppressing plate 270. At this time, the bonding agent 252 reached the projection part 272 flows onto the end part 204 of the insulating substrate 202, the connection part of the external wiring connection terminal 110 and the external wiring 80, and the end 104 of the insulating substrate 102 due to its fluidity, so that the above parts are covered with the bonding agent 252. The bonding agent 252 becomes the above-described bonding layer 250 after cured. In addition, a heat curing process and/or a UV curing process are performed as needed. Here, although the bonding agent 252 is the liquid type or gel type, a sheet type bonding agent may be used as long as it has fluidity before cured.

When the bonding agent 252 is positioned on the lower side of the strain suppressing plate 270 in the gravity direction as shown in FIGS. 13 and 14, the gravity can be used when the bonding agent 252 flows, and as a result, a time required to cover the substrate end part 204 and the like can be shortened, for example.

Then, the display screen can be curved by applying a load to a part serving as a bottom part of the concave configuration or a top part of the convex configuration.

Figure 15:
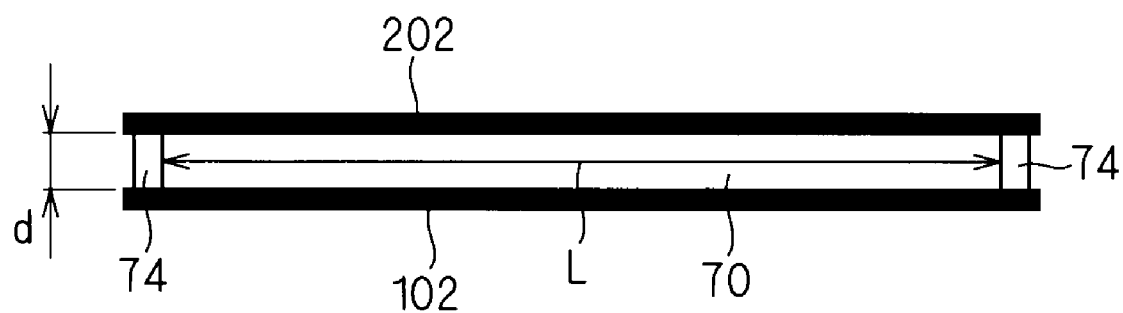
FIGS. 15 to 17 are sectional views illustrating strains caused by curving the substrates.
Figure 16:
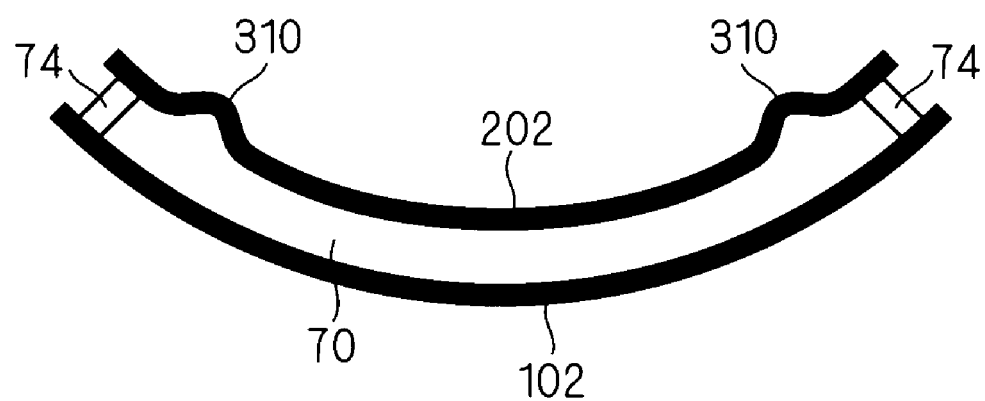
Figure 17:
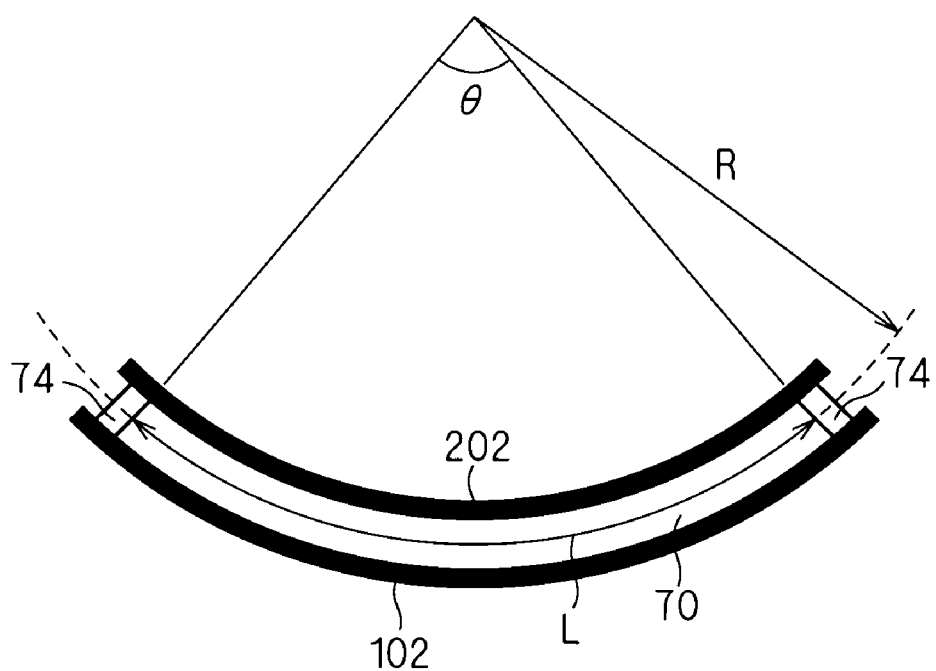

Here, the strain generated in curving the insulating substrate will be described with reference to FIGS. 15 to 17. FIGS. 15 to 17 are sectional views corresponding to FIG. 2, and briefly showing a structure from which the strain suppressing plate 270 and the bonding layer 250 are removed from the liquid crystal display device 50.

When the substrates are curved as shown in FIG. 16 by applying a load to the substrates in a flat state shown in FIG. 15 gradually, strains 310 are generated in the insulating substrate 202 on the side having the curvature center. Hereinafter, the strain caused by curving the substrate is also referred to as a curvature-caused strain. Since the gap between the insulating substrates 102 and 202, that is, the thickness of the liquid crystal 70 at the part in which the curvature-caused strain 310 is generated differs from that of the other part, and since displacement is caused between the substrates 102 and 202 at the part in which the curvature-caused strain 310 is generated, image quality deteriorates.

Here, it is assumed that the gap between the insulating substrates 102 and 202 is d, a distance between the opposed seals 74 is L, and a thickness of each of insulating substrates 102 and 202 is t (not shown). To implement the ideal case where the curvature-caused strain 310 is not generated (see FIG. 17), an arc length of the insulating substrate 102 with respect to the curvature center needs to differ from that of the insulating substrate 202 to form the curvature with the gap d kept constant. When it is assumed that a curvature radius from the center between the insulating substrates 102 and 202 is R, and an angle with respect to the case where the arc length between the right and left seals 74 along the above center is kept L is θ, the following equation 1 is established.

$$\theta = L/R \quad \text{(equation 1)}$$

At this time, an arc length La of the insulating substrate 102 along its center and an arc length Lf of the insulating substrate 202 along its center are given by the following equation 2 and equation 3.

$$La = \theta \times \{R + (d+t)/2\} \quad \text{(equation 2)}$$

$$Lf = \theta \times \{R - (d+t)/2\} \quad \text{(equation 3)}$$

Based on the equations 1 to 3, a difference ΔL (=La−Lf) between the arc length La and Lf is expressed by the following equation 4.

$$\Delta L = L \times (d+t)/R \quad \text{(equation 4)}$$

This difference ΔL needs to be provided to obtain the uniform gap d. However, the difference ΔL is hard to obtain between the insulating substrates 102 and 202 in which the peripheries are fixed by the seal 74. Thus, the curvature-caused strain 310 is generated.

Figure 18:
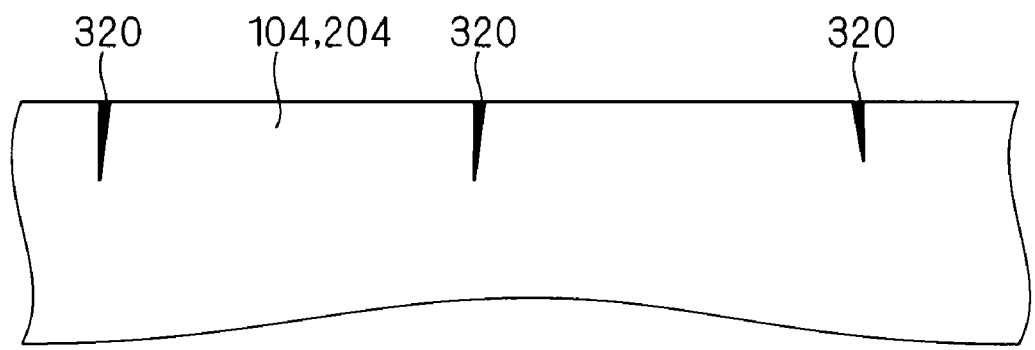
FIG. 18 is a plan view illustrating a crack in an end part of the substrate.

Meanwhile, according to the liquid crystal display device 50, since the strain suppressing plate 270 having the rigidity higher than that of the insulating substrate 102 is attached onto the insulating substrate 102, the curvature-caused strain 310 can be prevented due to the rigidity of the strain suppressing plate 270. Furthermore, the strain suppressing plate 270 has the projection part 272, and the substrate end parts 104 and 204 are covered with the bonding layer 250 provided on the projection part 272. In other words, since the strain suppressing plate 270 has the projection part 272, the bonding layer 250 can be provided beyond the substrate end parts 104 and 204, so that the substrate end parts 104 and 204 are covered with it. Since the substrate end parts 104 and 204 are covered with the bonding layer 250, cracks 320 (see FIG. 18) such as microscopic cracks generated in the substrate end parts 104 and 204 are filled with the bonding layer 250. Thus, a large crack originated from the crack 320 can be prevented from being generated. Thus, according to the liquid crystal display device 50, since both of the curvature-caused strain 310 and the enlargement of the crack 320 are prevented, image quality, reliability, durability, yield can be improved. In addition, since the strain suppressing plate 270 serves as a protection member against externally applied shock, the reliability, durability, and yield can be improved in this respect also.

In addition, the strain suppressing plate 270 can prevent the curvature-caused strain 310 not only in the case where the liquid crystal display device 50 is curved based on a design, but also in the case where it is curved accidentally.

In addition, since the bonding layer 250 covers the connection part of the external wiring connection terminal 110 and the external wiring 80, the connection of them can be strong and the connection part can be protected against external environments.

In the above, not only the substrate end part 204 but also the connection part of the external wiring connection terminal 110 and the external wiring 80, and the substrate end part 104 are covered with the bonding layer 250. Alternatively, the bonding layer 250 may be formed so as to cover only the substrate end part 204, or cover the substrate end part 204 and the wiring connection part.

In addition, in the above, the strain suppressing plate 270 has the projection part 272 extending beyond the insulating substrate 202, and the bonding layer 250 is formed on the projection part 272 of the strain suppressing plate 270 to cover the substrate end part 204. Meanwhile, even when the strain suppressing plate 270 does not have the projection part 272, and the bonding layer 250 is not provided on the projection part 272 and not cover the substrate end part 204, as long as the strain suppressing plate 270 is provided, the curvature-caused strain 310 can be prevented due to the rigidity of the strain suppressing plate 270. This will be described with reference to FIGS. 15 and 16.

When the load is gradually applied to the substrate in the flat state shown in FIG. 15, the curvature-caused strain 310 is generated as shown in FIG. 16. Here, when the strain suppressing plate 270 is attached onto the insulating substrate 202, the insulating substrate 202 is constrained by the strain suppressing plate 270. Therefore, even when the load concentrates on one part of the insulating substrate 202, the insulating substrate 202 can be prevented from being deformed (curvature-caused strain 310 is prevented) by the force of constraint of the strain suppressing plate 270.

In addition, according to a laminated body of the insulating substrates 102 and 202 as shown in FIG. 15, a neutral surface according to material mechanics is provided in the center of the two insulating substrates 102 and 202. When this is curved, a tensile stress is applied to the insulating substrate 102 and a compressive stress is applied to the insulating substrate 202 as shown in FIG. 16. Therefore, since the insulating substrate 102 is tensed and the insulating substrate 202 is compressed, the curvature-caused strain 310 is generated. However, since the neutral surface is moved toward the strain suppressing plate 270 by attaching the strain suppressing plate 270, the tensile stress can be applied to both of the insulating substrates 102 and 202, or the compressive stress can be reduced. In other words, the stress causing the curvature-caused strain 310 itself can be prevented.

Next, a description will be made of a merit of attaching the strain suppressing plate 270 when the tensile stress is applied to the insulating substrate 202.

In the case where there is a crack in the insulating substrate 202, when the tensile load is applied, the crack could extend. However, when the strain suppressing plate 270 is attached on the insulating substrate 202, since the insulating substrate 202 is restrained by the strain suppressing plate 270, the deformation due to the extension of the crack can be prevented. In other words, in the case where the strain suppressing plate 270 is attached, even when there is already a crack in the insulating substrate 202, the extension thereof can be prevented.

Furthermore, when the strain suppressing plate 270 has the projection part 272, since the substrate end part 204 is protected, the crack of the substrate end part 204 generated due to various cause at the time of production can be prevented from extending.

Figure 19:
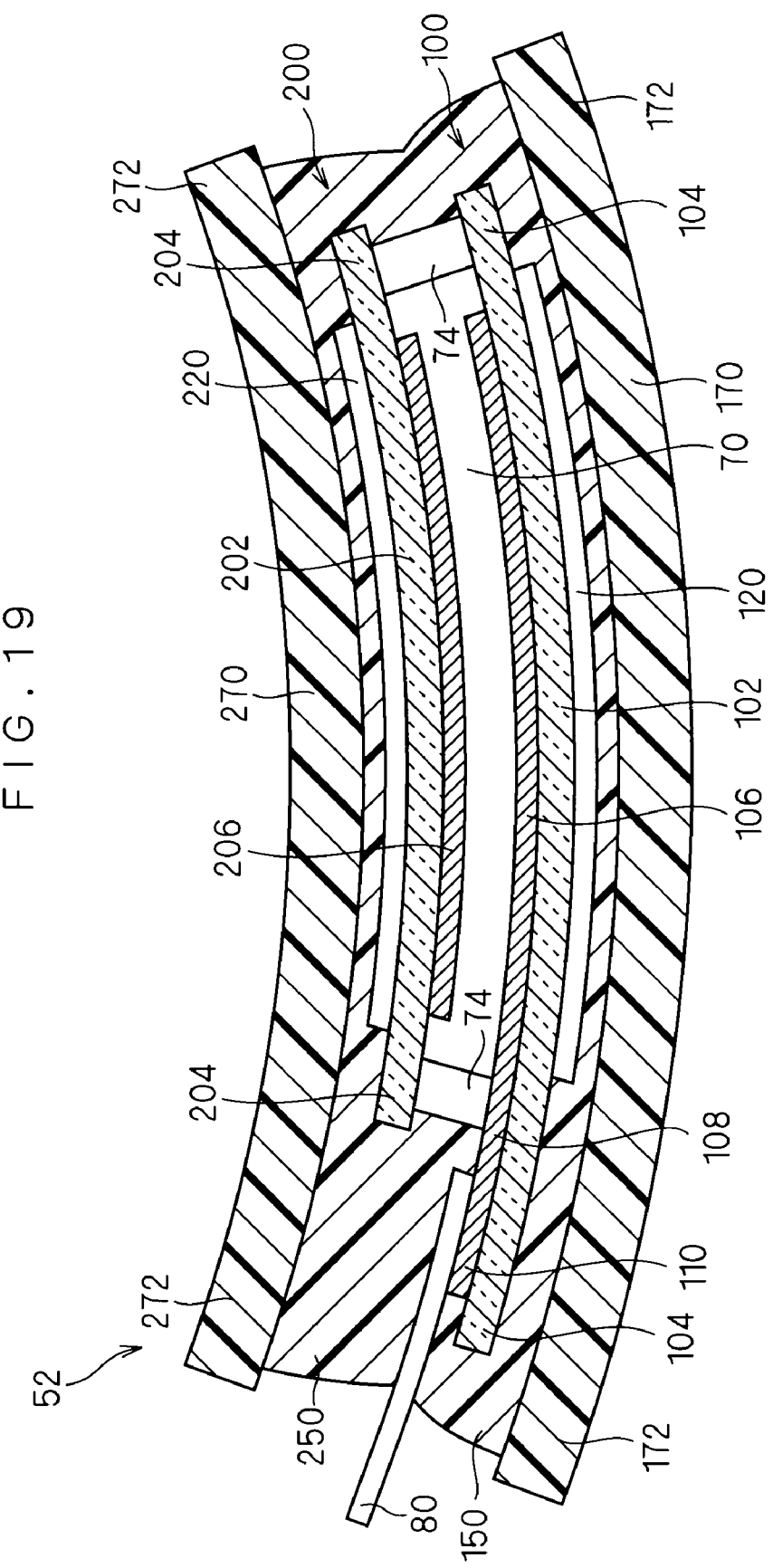
FIG. 19 is a sectional view illustrating a display device according to a variation of the first embodiment.

Here, a variation of the liquid crystal display device 50 is illustrated in FIG. 19. A liquid crystal display device 52 illustrated in FIG. 19 has a structure in which a bonding layer 150 and a strain suppressing plate 170 are added to the above liquid crystal display device 50.

The bonding layer 150 is arranged on the outer surface side of the insulating substrate 102, and arranged on the polarizing plate 120 in the figure. The strain suppressing plate 170 is arranged on the bonding layer 150. The strain suppressing plate 170 is fixed to the whole surface of the insulating substrate 102 by the bonding layer 150.

The strain suppressing plate 170 may be formed of the same material as that of the above strain suppressing plate 270. In addition, the strain suppressing plate 170 has rigidity higher than that of the insulating substrate 102 and the rigidity can be given similar to the case of the strain suppressing plate 270.

The strain suppressing plate 170 is larger than the insulating substrate 102 and has a projection part 172 extending beyond the insulating substrate 102 while it is attached on the insulating substrate 102. In the drawing, the projection part 172 is provided over the whole periphery of the strain suppressing plate 170.

The bonding layer 150 is provided not only between the insulating substrate 102 and the strain suppressing plate 170 but also on the projection part 172 of the strain suppressing plate 170. At this time, the bonding layer 150 on the projection part 172 covers the end part 104 of the insulating substrate 102.

A step of forming the bonding layer 150 and a step of bonding the strain suppressing plate 170 may be performed similar to the above steps of the bonding layer 250 and the strain suppressing plate 270.

The liquid crystal display device 52 achieves the following effect as well as the same effect as that of the liquid crystal display device 50. The curvature-caused strain of the insulating substrate 102 can be prevented by the strain suppressing plate 170. Furthermore, since the bonding layer 150 is closer to the insulating substrate 102 as compared with the bonding layer 250, the end part 104 of the substrate 102 can be more surely covered with the bonding layer 150. Thus, the crack preventing effect of the insulating substrate 102 is improved. The strain suppressing plate 170 also serves as a protection member against external shock. Thus, the image quality, reliability, durability and yield and the like can be improved in the liquid crystal display device 52 also.

In addition, since the liquid crystal display device 52 has the two strain suppressing plates 170 and 270, it can be adapted to curvature in either direction. The strain suppressing plate 170 is adaptable to the accidental curvature as well as the designed curvature.

Even when the strain suppressing plate 270 and the bonding layer 250 are removed from the liquid crystal display device 52, the same effect as in the liquid crystal display device 50 can be achieved.

Second Embodiment

According to the structure of the liquid crystal display device 50 and production method thereof, the bonding agent 252 overflows to the projection part 272 of the strain suppressing plate 270 (see FIGS. 13 and 14). At this time, when the overflowing amount of the bonding agent 252 is small, the substrate end part 104 could not be covered with the bonding agent 252. Thus, according to a second embodiment, a production method adaptable to such a case and a liquid crystal display device 54 produced thereby will be described with reference to sectional views in FIGS. 20 to 23.

First, the structure shown in FIG. 12 is produced by the production method according to the first embodiment or another production method.

Figure 20:
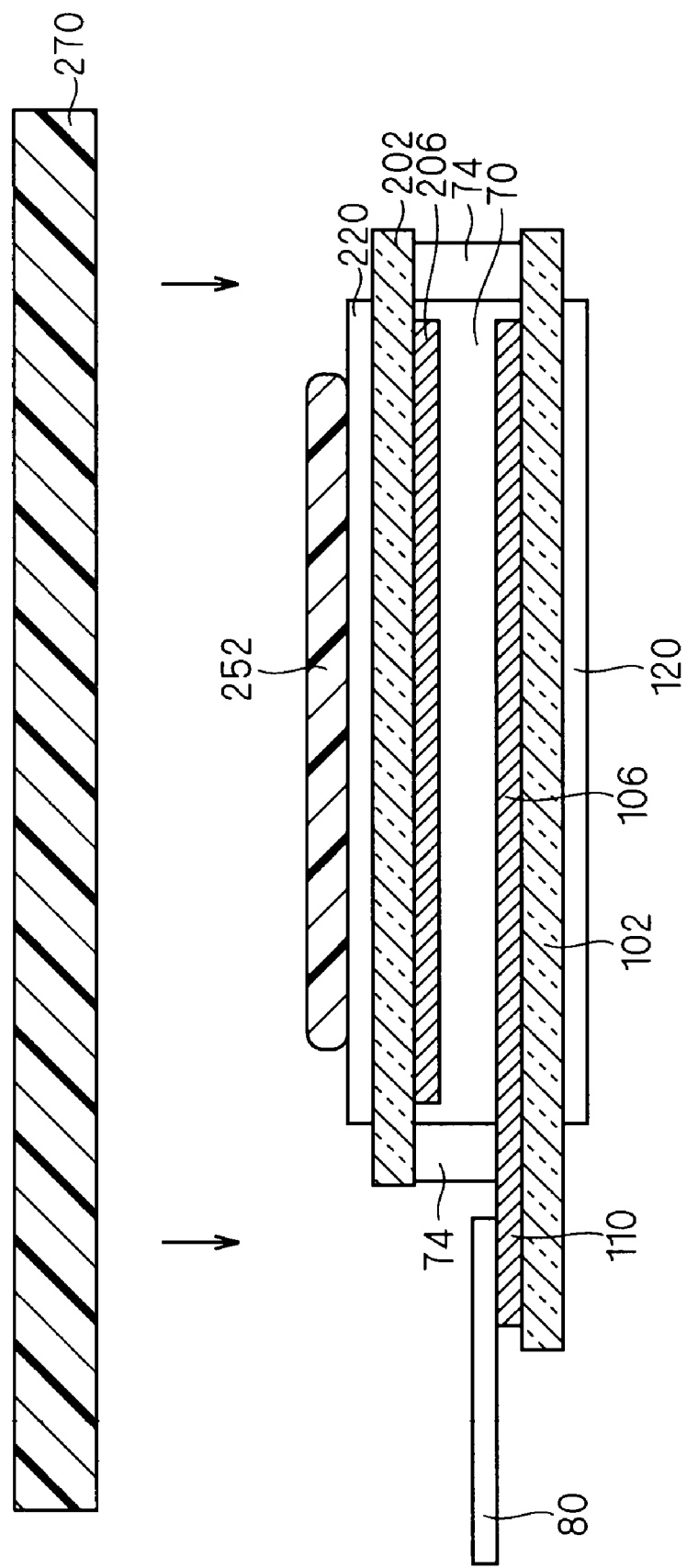
FIGS. 20 to 22 are sectional views illustrating production steps of a display device according to a second embodiment.
Figure 21:
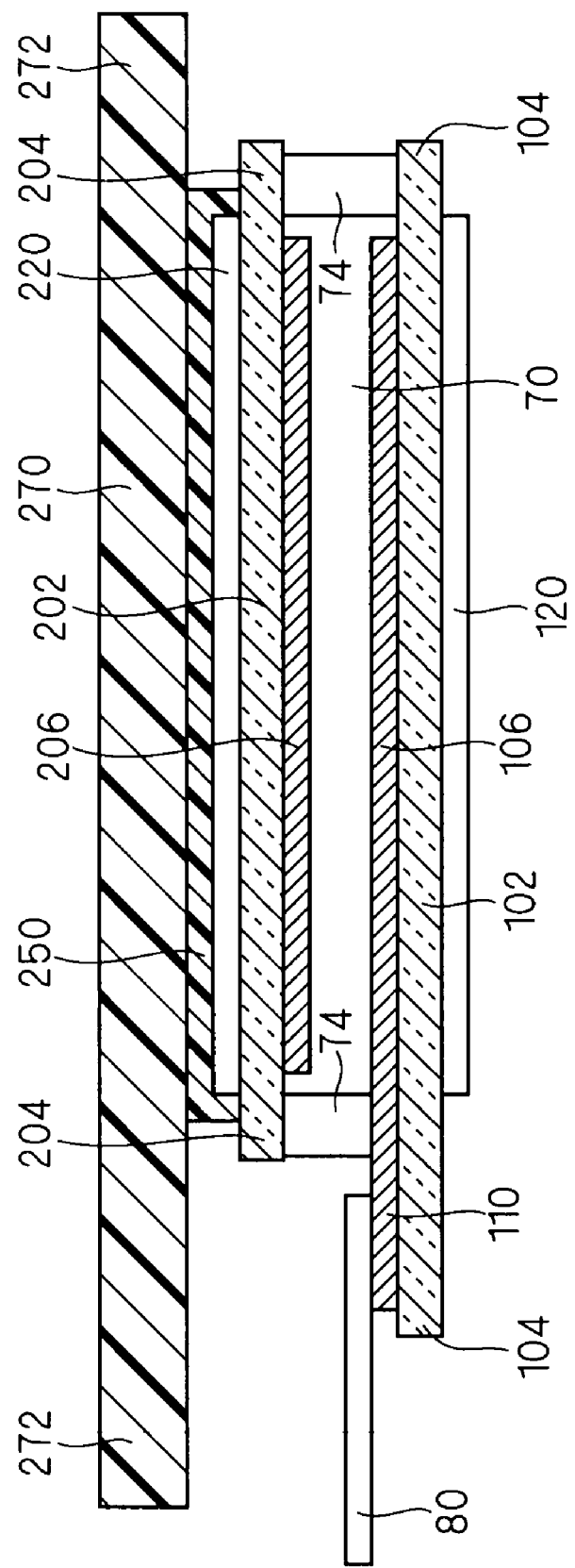
Figure 22:
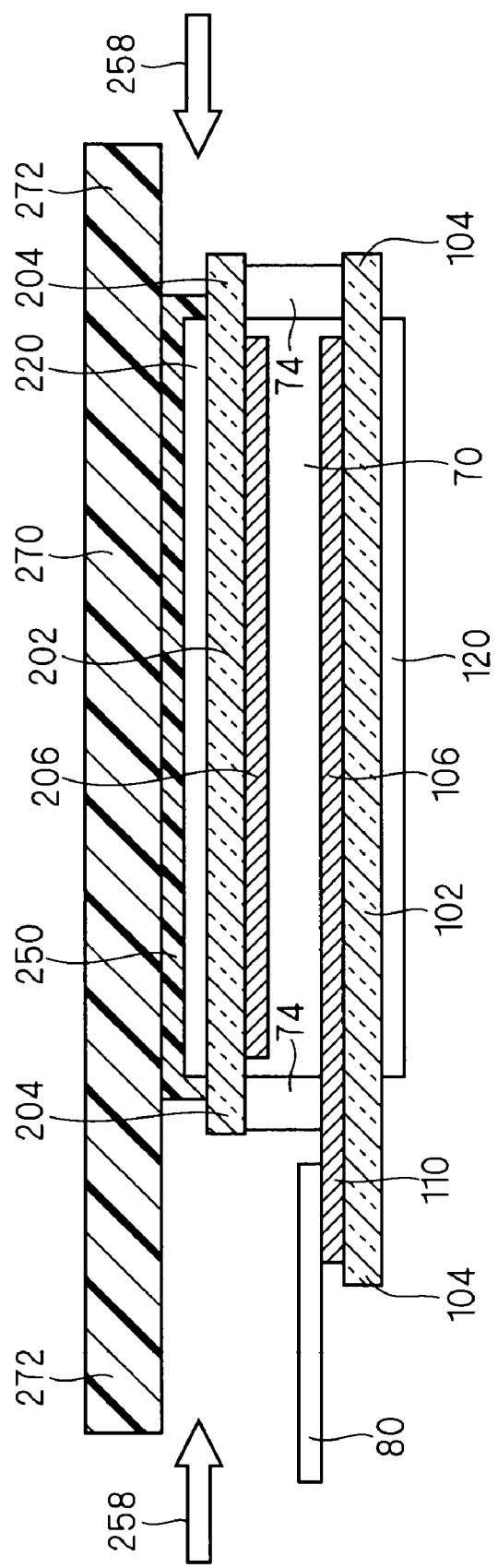

Then, as shown in FIG. 20, the liquid type or gel type bonding agent 252 is applied onto the polarizing plate 220, and the strain suppressing plate 270 is opposed to the insulating substrate 202 such that the strain suppressing plate 270 has the projection part 272. Then, as shown in FIG. 21, the strain suppressing plate 270 is attached by the bonding agent 252, and the insulating substrate 202 and the strain suppressing plate 270 are fixed to each other. FIGS. 20 and 21 show the state in which the applied amount of the bonding agent 252 is small, and the bonding agent 252 does not reach the projection part 272 of the strain suppressing plate 270 after attachment. Therefore, the end part 104 of the insulating substrate 102 and the like are not covered with the bonding agent 252 in this stage. In addition, the bonding agent 252 may be a sheet type.

Then, a liquid type or gel type resin material is applied to the projection part 272 of the strain suppressing plate 270 and the end part 204 of the insulating substrate 202 and the like are covered with the resin material. Here, the resin material is applied by ejecting the resin material from the side of the strain suppressing plate 270 as schematically shown by an arrow 258 in FIG. 22. The resin material is hardened to be a resin layer 256 shown in FIG. 23. Then, the production steps according to the first embodiment can be applied to the subsequent steps.

As shown in FIG. 23, the liquid crystal display device 54 according to the second embodiment is different from the above liquid crystal display device 50 (see FIG. 3) in that the range (configuration) of the bonding layer 250 is different and the resin layer 256 is added. More specifically, the bonding layer 250 is only provided between the insulating substrate 202 and the strain suppressing plate 270 and does not reach the projection part 272 of the strain suppressing plate 270. Meanwhile, the resin layer 256 is provided on the projection part 272 of the strain suppressing plate 270, and covering the end part 204 of the insulating substrate 202.

FIG. 23 illustrates the case where not only the end part 204 of the insulating substrate 202 but also the connection part of the external wiring connection terminal 110 and the external wiring 80, and the end part 104 of the insulating substrate 102 are covered with the resin layer 256. Alternatively, the resin layer 256 may be formed so as to cover the substrate end part 204 only, or cover the substrate end part 204 and the above wiring connection part.

According to the liquid crystal display device 54, since the substrate end part 204 and the like are covered with the resin layer 256, the same effect as in the liquid crystal display device 50 can be achieved.

Here, the resin layer 256 (that is, the above resin material) may be the same material as that of the bonding layer 250 (that is, the bonding agent 252), or may be a different material. For example, when the sufficient bonding strength is provided by the bonding layer 250 and the strain can be suppressed by it, the resin layer 256 may have bonding force lower than that of the bonding layer 250. At this time, when the resin layer 256 is formed of a material having a moisture-proof property (acrylic resin and the like) higher than that of the bonding layer 250, the reliability, durability, and yield can be further improved.

In addition, although the case where the bonding agent 252 is hardened before forming the resin layer 256 is illustrated in FIGS. 20 to 23, the bonding agent 252 and the resin material for the resin layer 256 may be hardened in the same step.

In the production method having the step of applying the resin material can be applied to the case where the bonding agent 252 does not protrude according to the design and the case where the bonding agent 252 does not protrude accidentally. In addition, the production method can be applied to the liquid crystal display device 52 having the two strain suppressing plates 170 and 270.

In the first and second embodiments, the strain suppressing plates 170 and 270 have the projection parts 172 and 272 around their whole peripheries, respectively, and the bonding layer 250 or the resin layer 256 is provided over the whole peripheries of the projection parts 172 and 272. Meanwhile, the above various effects can be achieved even when the projection parts 172 and 272 are provided only at a part of the whole peripheries of the strain suppressing plates 170 and 270, respectively.

In addition, although the glass substrate is used for the insulating substrates 102 and 202 in the first and second embodiment, even in a case of a substrate formed of another material such as a resin material, the curvature-caused strain could be generated and the crack could be generated and expanded. Thus, the insulating substrates 102 and 202 are not limited to the illustrated glass substrate.

In addition, the strain suppressing plate 270 and the bonding layer 250 and the like can be applied to another display device such as an EL display device or a plasma display device as well as the liquid crystal display device illustrated in the first and second embodiments.

Although a reinforcement plate is attached onto the glass substrate by a bonding agent in a liquid crystal display device disclosed in the Japanese Patent Application Laid-Open No. 2004-46115, the bonding agent exists only between the glass substrate and the reinforcement plate and does not cover an end part of the glass substrate.

While the invention has been shown and described in detail, the foregoing description is in all aspects illustrative and not restrictive. It is therefore understood that numerous modifications and variations can be devised without departing from the scope of the invention.

What is claimed is:

1. A display device comprising:
   a pair of insulating substrates arranged to be opposed;
   a bonding layer provided on the outer surface side of one insulating substrate of said pair of insulating substrates; and
   a strain suppressing plate fixed to said one insulating substrate by said bonding layer and having rigidity higher than that of said one insulating substrate to suppress a strain caused by curving said one insulating substrate.

2. The display device according to claim 1, wherein said strain suppressing plate has a projection part extending beyond said one insulating substrate.

3. The display device according to claim 2, wherein said bonding layer extends to said projection part of said strain suppressing plate to cover an end part of said one insulating substrates.

4. The display device according to claim 3 further comprising:
   an external wiring connection terminal provided on the other substrate of said pair of insulating substrates so as to be opposed to said projection part of said strain suppressing plate; and
   an external wiring connected to said external wiring connection terminal, wherein
   a connection part of said external wiring connection terminal and said external wiring is covered with said bonding layer extending to said projection part of said strain suppressing plate.

5. The display device according to claim 3, wherein an end part of the other insulating substrate of said pair of insulating substrates is also covered with said bonding layer extending to said projection part of said strain suppressing plate.

6. The display device according to claim 4, wherein an end part of the other insulating substrate of said pair of insulating substrates is also covered with said bonding layer extending to said projection part of said strain suppressing plate.

7. The display device according to claim 1, further comprising:
   another bonding layer provided on the outer surface side of the other insulating substrate of said pair of insulating substrates; and
   another strain suppressing plate fixed to said other insulating substrate by said another bonding layer on the side of said other insulating substrate and having rigidity higher than that of said other insulating substrate to suppress a strain caused by curving said other insulating substrate.

8. The display device according to claim 7, wherein said another strain suppressing plate on the side of said other insulating substrate has a projection part extending beyond said other insulating substrate.

9. The display device according to claim 8, wherein
said another bonding layer on the side of said other insulating substrate extends to said projection part of said another strain suppressing plate on the side of said other insulating substrate to cover the end part of said other insulating substrate.

10. The display device according to claim 2, further comprising:
a resin layer provided on said projection part of said strain suppressing plate to cover an end part of said one insulating substrate.

11. The display device according to claim 10, wherein
said resin layer is formed of a material having a moisture-proof property higher than that of said bonding layer.

12. A production method of the display device, comprising the steps of:
(a) arranging an insulating substrate and a strain suppressing plate so as to be opposed to each other so that said strain suppressing plate has a projection part extending beyond said insulating substrate, and fixing them by a bonding agent, said strain suppressing plate having rigidity higher than that of said insulating substrate to suppress a curvature-caused strain of said insulating substrate; and
(b) applying a resin material onto said projection part of said strain suppressing plate so that an end part of said insulating substrate is covered with said resin material.

* * * * *